(12) United States Patent
Hohenbichler et al.

(10) Patent No.: US 11,346,395 B2
(45) Date of Patent: May 31, 2022

(54) CAPTURING AND TRANSMITTING DATA OF A BEARING OF A STEEL MILL OR ROLLING MILL

(71) Applicant: Primetals Technologies Austria GmbH, Linz (AT)

(72) Inventors: Gerald Hohenbichler, Kronstorf (AT); Andreas Rohrhofer, Eferding (AT)

(73) Assignee: PRIMETALS TECHNOLOGIES AUSTRIA GMBH, Linz (AT)

( * ) Notice: Subject to any disclaimer, the term of this patent is extended or adjusted under 35 U.S.C. 154(b) by 0 days.

(21) Appl. No.: 17/311,312

(22) PCT Filed: Dec. 3, 2019

(86) PCT No.: PCT/EP2019/083516
§ 371 (c)(1),
(2) Date: Jun. 4, 2021

(87) PCT Pub. No.: WO2020/115054
PCT Pub. Date: Jun. 11, 2020

(65) Prior Publication Data
US 2021/0362205 A1    Nov. 25, 2021

(30) Foreign Application Priority Data

Dec. 5, 2018 (EP) .................................. 18210501

(51) Int. Cl.
*B21B 38/00* (2006.01)
*F16C 41/00* (2006.01)
(Continued)

(52) U.S. Cl.
CPC ............ *F16C 19/522* (2013.01); *B21B 31/02* (2013.01); *B21B 38/00* (2013.01); *F16C 41/008* (2013.01);
(Continued)

(58) Field of Classification Search
CPC ........ F16C 17/03; F16C 19/08; F16C 19/522; F16C 19/525; F16C 19/527; F16C 35/047;
(Continued)

(56) References Cited

U.S. PATENT DOCUMENTS

| | | | |
|---|---|---|---|
| 6,926,445 B2* | 8/2005 | Sato ...................... | D21G 1/0226 384/448 |
| 7,394,395 B2* | 7/2008 | Sakatani ................ | G01H 1/003 340/679 |
| 7,688,216 B2* | 3/2010 | Mizutani ............... | F16C 41/008 340/635 |

(Continued)

FOREIGN PATENT DOCUMENTS

| | | |
|---|---|---|
| DE | 112004001448 T5 | 10/2006 |
| DE | 102007061279 A1 | 6/2009 |

(Continued)

OTHER PUBLICATIONS

International Search Report and Written Opinion received in International Application No. PCT/EP2019/083516 dated Feb. 11, 2020, pp. 18.

(Continued)

*Primary Examiner* — Alan B Waits
(74) *Attorney, Agent, or Firm* — Liang & Hennessey LLP; Brian Hennessey

(57) ABSTRACT

A device for capturing and transmitting data of a bearing of a steel mill or rolling mill includes a sensor with a data processing unit arranged in a bearing housing capturing and storing data of a bearing. A data transmission unit in the bearing housing wirelessly transmits data of the sensor to a remote receiver. An energy receiving unit in the bearing housing receives energy wirelessly and transmits it to the data transmission unit and the data processing unit. An energy source with an energy transmitting unit arranged (Continued)

outside the bearing housing supply the energy unit wirelessly. The energy transmitting unit is covered by the bearing housing and is arranged on or in a structural part which adjoins the bearing housing and is part of the supporting structure of mill and remains on the supporting structure of the mill when the bearing housing is removed for maintenance purposes.

17 Claims, 3 Drawing Sheets

(51) Int. Cl.
*B21B 31/07* (2006.01)
*F16C 19/52* (2006.01)
*B21B 31/02* (2006.01)

(52) U.S. Cl.
CPC ............. *B21B 31/07* (2013.01); *F16C 19/525* (2013.01); *F16C 19/527* (2013.01)

(58) Field of Classification Search
CPC ................ F16C 41/007; F16C 2322/12; F16C 41/008; B21B 31/02; B21B 31/07; B21B 38/00; G01M 13/04; G01P 3/443; G01P 3/446; G01P 3/448; G08C 19/00; G08C 19/12; G08C 19/26; G08C 17/00; G08C 15/00; H02K 50/80; H02K 50/502; H02K 50/40; H02K 38/14
See application file for complete search history.

(56) References Cited

U.S. PATENT DOCUMENTS

| | | | |
|---|---|---|---|
| 8,880,359 B2 * | 11/2014 | Ince | G01M 13/022 702/42 |
| 2003/0048962 A1 * | 3/2003 | Sato | B61K 9/04 384/448 |
| 2003/0218548 A1 * | 11/2003 | Sato | F16C 19/522 340/870.01 |
| 2008/0234964 A1 * | 9/2008 | Miyasaka | F16C 19/527 702/113 |
| 2015/0168256 A1 * | 6/2015 | Hamilton | G01M 13/04 73/593 |

FOREIGN PATENT DOCUMENTS

| | | | | |
|---|---|---|---|---|
| DE | 102009037424 A1 | | 2/2011 | |
| DE | 102014212530 A1 | | 12/2015 | |
| DE | 112013006872 T5 | * | 12/2015 | ............ B61F 15/26 |
| EP | 0963051 A2 | | 12/1999 | |
| JP | 2004003601 A | * | 1/2004 | ............ F16C 19/522 |
| RU | 2029145 C1 | | 2/1995 | |
| RU | 2504701 C2 | | 1/2014 | |
| RU | 172640 U1 | | 7/2017 | |
| WO | 2007045351 A1 | | 4/2007 | |
| WO | WO-2009015735 A2 | * | 2/2009 | ............ G01P 3/481 |
| WO | WO-2013160061 A1 | * | 10/2013 | ............ F16C 19/525 |
| WO | 2017174431 A1 | | 10/2017 | |

OTHER PUBLICATIONS

Russian Office Action received in Russian Application No. 2021115437/05(032609) dated Dec. 7, 2021, pp. 17.

* cited by examiner

CAPTURING AND TRANSMITTING DATA OF A BEARING OF A STEEL MILL OR ROLLING MILL

CROSS-REFERENCE TO RELATED APPLICATIONS

The present application is a national phase application of PCT Application No. PCT/EP2019/083516, filed Dec. 3, 2019, entitled "CAPTURING AND TRANSMITTING DATA OF A BEARING OF A STEEL MILL OR ROLLING MILL", which claims the benefit of European Patent Application No. EP18210501, filed Dec. 5, 2018, each of which is incorporated by reference in its entirety.

BACKGROUND OF THE INVENTION

1. Field of the Invention

Capturing and transmitting data of a bearing of a steel mill or rolling mill.

2. Description of the Related Art

In order to capture the loading of a bearing, in particular in a steel mill or rolling mill, over time, either the bearings are equipped with corresponding sensors from the beginning, or sensors that are supplied with energy via cables and slip rings are temporarily installed, the data also being transmitted from the sensor in the bearing via cables and slip rings. Cabling arrangements are not suitable for continuous operation, because they may get in the way or be damaged during operation and maintenance.

U.S. Pat. No. 7,394,395 B2 discloses a sensor and a bearing housing of a casting installation or rolling installation that transmits the data concerning the state of the bearing wirelessly. For supplying energy to the sensor, either batteries are provided in the bearing housing (FIGS. 4A, 4B and 16), or a generator in the bearing housing (FIG. 17), or an energy source of the data transmission unit, which is arranged on or in the bearing housing (FIG. 17).

Batteries in the bearing housing are disadvantageous, because they can be damaged by brief overheating, as occurs in a steel mill or rolling mill. Moreover, the bearing housings are designed with regard to the loading of the rotatable components, and therefore offer only very limited space for batteries or generators, for instance in the form of cavities. Arranging an energy source at any location outside the bearing housing likewise entails the risk of impairment due to process heat.

DE 11 2004 001 448 T5 discloses a mechanical construction, for example a wheel bearing of a vehicle, with wireless sensors, which can read data from bearing assemblies. A sensor-signal receiving unit, which is arranged at a distance from the wheel bearing, has a feed-current transmitting part and a sensor-signal receiving part. The sensor-signal receiving part receives the sensor signals from the wireless sensor units, the feed-current transmitting part transmits the electrical operating power by means of electromagnetic waves to the wireless sensor units. No bearing housing is disclosed, and so the position of the feed-current transmitting part in relation to a possible bearing housing cannot be established. According to DE 11 2004 001 448 T5, the sensor-signal receiving unit with the feed-current transmitting part may be arranged at any suitable location. However, any desired arrangement is not possible in the long term for use in a steel mill or rolling mill, because of the thermal loading occurring there.

SUMMARY OF THE INVENTION

An object of the present invention is therefore to overcome the disadvantages of the prior art and propose a device for capturing and transmitting data of a bearing of a steel mill or rolling mill that does not have an energy source within the bearing housing but nevertheless ensures a common supply of energy to the data transmission unit and the data processing unit and preferably makes maintenance of the bearing or bearing housing easier.

This object is achieved according to the invention by a device for capturing and transmitting data of a bearing of a steel mill or rolling mill, the device at least comprising:
- a bearing housing for a bearing for rotatable components,
- a sensor with a data processing unit, both of which are arranged in the bearing housing and are designed for capturing and storing data of the bearing,
- a data transmission unit, which is arranged in the bearing housing and is designed for wirelessly transmitting data of the sensor to a remote receiver,
- an energy receiving unit, which is arranged in the bearing housing and is designed to receive energy wirelessly and pass it on (generally in a cable-bound manner) to the data transmission unit and the data processing unit, and
- an energy source with an energy transmitting unit, which is designed to supply the energy receiving unit wirelessly with energy,
- a supporting structure of a steel mill or rolling mill.

The rotatable component may be the roll of a rolling mill or the roller of a strand guide of a continuous casting installation or the roller of a strip guide of a strip casting installation, or other operationally critical components, which should therefore be monitored online, such as for instance coiling mandrels, universal joint shafts, flatness measuring rollers, rotating nozzle heads for descaling (rotary descalers), and shear drums The bearing housing receives the actual bearing and is generally releasably connected to a supporting structure, for example of the steel mill or rolling mill, in order that the bearing housing can be removed from the supporting structure and brought to another location for maintenance of the bearing or the bearing housing. The bearing may be a rolling bearing, a roller bearing, a sliding bearing, or a joint.

It is in this case provided
- that the energy source and the energy transmitting unit are arranged outside a bearing housing,
- that the energy transmitting unit is arranged on or in a structural part which adjoins the bearing housing and is part of the supporting structure of the steel mill or rolling mill,
- that the structural part is designed to remain on the supporting structure of the steel mill or rolling mill when the bearing housing is removed for maintenance purposes, and
- that the energy transmitting unit is covered by the bearing housing.

The energy source and the energy transmitting unit are arranged outside the bearing housing, wherein the energy transmitting unit is mounted in such a way that it remains in situ on the bearing structure of the steel mill or rolling mill when the bearing housing is removed, and no independent steps have to be taken for removing the energy transmitting unit from the bearing housing. The energy source, which is generally even further away from the bearing housing than the energy transmitting unit, will consequently likewise remain in situ when the bearing housing is removed, for example in the supporting structure of the steel mill or rolling mill. If the energy source is further away from the bearing housing than the energy transmitting unit, it is ensured that the energy source is in any event exposed to lower thermal loading, thereby ensuring that it is supplied with energy on a long-term basis.

The bearing housing may be made of steel. The bearing housing may surround the strand guiding bearing of a bloom or slab continuous casting installation. To this extent, the bearing housing may be part of a strand guide of a bloom or slab continuous casting installation.

Coming into consideration as sensors are for example sensors for measuring the temperature, the pressure, the acceleration (for example triaxial accelerometers), and the force. The force sensor may for example be based on the piezo principle or on the principle of capacitive (dielectric) measurement technology. If a lubrication or a cooling of the bearing or of the rotatable component is provided, a sensor for monitoring the lubrication or for measuring the coolant through-flow may also be provided. In principle, all sensors that produce an electrically processable signal come into consideration.

The data processing unit generally comprises at least one processor (CPU) and a memory, for example a memory chip, and is generally connected to the sensor or sensors via cables and/or conductor tracks of a printed circuit board. In the data processing unit, the measurement data may be preprocessed, digitized and buffer-stored.

The data transmission unit generally comprises an antenna, which is connected to the data processing unit, for example via a cable or a conductor track of a printed circuit board. The data transmission unit transmits for example data such as overloads, temporal mean values, standard deviations, peak-to-peak values, together with a unique identification (ID) and possibly a timestamp to the remote receiver, for example a reader with a corresponding antenna. The receiver may be for example one to five meters, preferably less than thirty meters, particularly preferably less than ten meters, away from the bearing housing. The data transmission unit may for example transmit signals at a frequency of more than 800 MHz, in particular more than 2.4 GHz, to the receiver. The high transmission frequencies are necessary to maintain secured data channels and to avoid false signal assignments or interference errors. The data transmission from the data transmission unit to the receiver may take place at prescribed time intervals, for example every second or every 5, 10, or 30 seconds, or every 60 or more seconds, or when requested by the receiver. The receiver may process data from a number of data transmission units. The receiver, or a transmitter connected to it, may subsequently pass on the data to a data cloud, where they can then be stored, further processed, and used for monitoring and controlling the rotatable components.

The energy receiving unit will generally pass on the wirelessly received energy to the data transmission unit, the memory, and the data processing unit via a cable or a conductor track of a printed circuit board.

The data processing unit, that is to say for instance the CPU and the memory, and the data transmission unit, that is to say for instance the antenna, and the energy receiving unit may be provided on a common printed circuit board. This common printed circuit board may be physically made up of a number of subunits, which are mechanically connected to one another. The common printed circuit board preferably has a surface area of less than 4000 mm2, is therefore for example less than 50×80 mm in size. Still more preferably, the printed circuit board has a surface area of less than 3000 mm2, that is to say for example less than 40×75 mm, still more preferably less than 1800 mm2, is therefore for example less than 30×60 mm in size. In this way, the printed circuit board finds space in a very small recess of the bearing housing. In this regard, it is also advantageous if the printed circuit board together with the electronic components located on it is less than 18 mm high, in particular less than 30 mm high, particularly preferably less than 9 mm high.

It may correspondingly be provided that the common printed circuit board is arranged in a recess of the bearing housing, which recess has a greatest cross section less than 4000 mm2, preferably less than 3000 mm2, particularly preferably less than 1800 mm2.

The energy source may be connected to the energy transmitting unit via a cable, for example via a two- or three-wire cable. The energy source may be a battery with a voltage of between 5 and 48 V, for example with 5 V, 9 V, 12 V, 24 V, or 48 V. The energy source and/or the energy transmitting unit generally has a DC-AC converter.

According to the invention, it is provided that the energy transmitting unit is covered by the bearing housing. This means that the bearing housing shields the energy transmitting unit from the rotatable component—mounted in the bearing of the bearing housing—which component in a rolling mill or steel mill is often exposed to high thermal loading. In other words, during the operation of the device according to the invention, the bearing housing is arranged between the energy transmitting unit and the rotatable component, seen in the direction normal to the axis of rotation of the rotatable component.

In order to achieve a short transmission path between the energy receiving unit in the bearing housing and the energy transmitting unit in the structural part, it may be provided that the energy receiving unit in the bearing housing and the energy transmitting unit in the structural part are in each case arranged close to the surface and close to one another. The energy receiving unit is therefore arranged close to that surface of the bearing housing that is facing the structural part, while the energy transmitting unit is arranged close to that surface of the structural part that is facing the bearing housing. The mutual distance of the energy receiving unit and the energy transmitting unit should be as small as possible, for example between 0 and 100 mm, in particular between 0.1 and 8 mm, particularly preferably between 0.2 and 3 mm. In the direction of the axis of rotation of the rotatable component, the energy receiving unit and the energy transmitting unit should in this case overlap, preferably cover one another. However, it is not ruled out that the energy receiving unit and the energy transmitting unit do not overlap, that is to say for instance that the energy transmitting unit is arranged next to the bearing housing.

One design of the invention consists in that the energy transmitting unit is arranged in a recess of the structural part that is aligned with the bearing housing in the operating state of the device. In this case, therefore, no material of the structural part is provided between the energy transmitting unit and the bearing housing; the energy transmission up to the bearing housing takes place via the air. The energy transmitting unit could however be encapsulated in a plastic or a resin for protection from environmental influences. The dimensions of the encapsulated energy transmitting unit preferably correspond to the dimensions of the recess to the extent that the encapsulated energy transmitting unit can be placed into the recess or inserted into the recess through an access opening, either with gaps of small dimensions or congruently with a form fit.

It may correspondingly also be provided that the energy receiving unit is arranged in a recess of the bearing housing that is aligned with the structural part in the operating state of the device. In this way it is ensured that there is no material of the bearing housing between the energy receiving unit and the structural part and that the energy transmission up to the structural part can therefore take place undisturbed electromagnetically.

It is advantageous if both the energy transmitting unit and the energy receiving unit are respectively arranged in a corresponding recess (that is to say open and aligned in relation to the other recess), because then the energy transmission takes place entirely undisturbed and is not attenuated by parts of the bearing housing or of the structural part.

In the case of a continuous casting installation, it may be provided that the energy source is a battery of a segment of a continuous casting installation or an AC power supply (for example with 230 or 400 V) of a segment of a continuous casting installation, the segment comprising one or more strand guiding rollers, and is connected to the energy transmitting unit by means of an electrical line.

One embodiment of the invention consists in that the energy transmitting unit and the energy receiving unit are designed to transmit and receive energy by inductive coupling, in particular resonant inductive coupling.

In the case of inductive energy transmission, an alternating magnetic field is generated in the transmitter by means of an oscillator. The transmission takes place by means of mutual induction between two coils, one coil in the transmitter and one coil in the receiver. An AC voltage is induced in the receiving coil by the alternating current in the transmitting coil; in applications such as the charging of storage batteries, this AC voltage is rectified and fed to the consumer as a DC voltage. The distance between the two coils represents the wireless transmission path and should be as small as possible—typical are a few millimeters to a distance of up to several 10 mm. As the distance between the two coils becomes greater, the stray flux increases greatly, whereby the inductive coupling decreases and the efficiency worsens. Typical distances that can be bridged by this method are approximately the coil diameter to twice the coil diameter; the frequency range used reaches from several 10 kHz into the MHz range.

The resonant inductive coupling represents an extension of the inductive coupling, in order to increase the range, which is only low. For this purpose, one or more free oscillating circuits are provided in the clear path between the transmitting coil and the receiving coil. Each of these oscillating circuits consists of a capacitor and a coil, the resonant frequency of which is adjusted to the transmission frequency. Resonance between the oscillating circuits leads to improved magnetic coupling between the transmitting coil and the receiving coil at the transmission frequency, which is accompanied by a greater range and better efficiency. A wireless energy transmission is consequently possible over a distance of the order of magnitude of 4 to 10 times the coil diameter.

A standardized transmission technology that can be used for the present invention is known as Qi. Qi is a proprietary standard of the Wireless Power Consortium for wireless energy transmission by means of electromagnetic induction over short distances.

One embodiment of the invention consists in that the energy transmitting unit and the energy receiving unit are designed such that the energy transmission takes place at a frequency greater than or equal to 100 kHz, in particular greater than 300 kHz.

The invention also comprises the use of a device according to the invention for capturing and transmitting data of a bearing of a steel mill or rolling mill. The use consequently comprises:

a bearing housing with a bearing for rotatable components, at least one sensor with a data processing unit, both of which are arranged in the bearing housing and capture and store data of the bearing, a data transmission unit, which is arranged in the bearing housing and transmits data of the sensor wirelessly to a remote receiver, an energy receiving unit, which is arranged in the bearing housing and receives energy wirelessly and passes it on (generally in a cable-bound manner) to the data transmission unit and the data processing unit, an energy source with an energy transmitting unit, which supplies the energy receiving unit wirelessly with energy, a supporting structure of a steel mill or rolling mill.

It is in this case provided that the energy source and the energy transmitting unit are arranged outside a bearing housing, and that the energy transmitting unit is arranged on or in a structural part which adjoins the bearing housing and is part of the supporting structure of the steel mill or rolling mill, which structural part is designed to remain on the supporting structure of the steel mill or rolling mill when the bearing housing is removed for maintenance purposes, and that the energy transmitting unit is covered by the bearing housing (14).

With the present invention, measured values can be continually transmitted from sensors in the bearing housing of any desired strand guides to a receiver, which allows continual monitoring of the state of the bearing or bearing housing of many strand guides, and so the measured values and variables derived from them are available in real time for the automation system (level 1 and level 2) of a steel mill or rolling mill, but also for the monitoring of aberrations in production. Consequently, for instance, predictions for future failures can be made or maintenance work planned.

The processing of the measured values generally takes place in a data cloud, where the information is transmitted via software applications to control systems of the steel mill or rolling mill and/or to operating personnel or plant or company managers.

BRIEF DESCRIPTION OF THE DRAWINGS

The invention is now explained in more detail on the basis of exemplary embodiments. The drawings are shown by way of example and are intended to illustrate the concept of the invention, but not to restrict it in any way or even represent it conclusively.

In the drawings.

DETAILED DESCRIPTION

Figure 1:
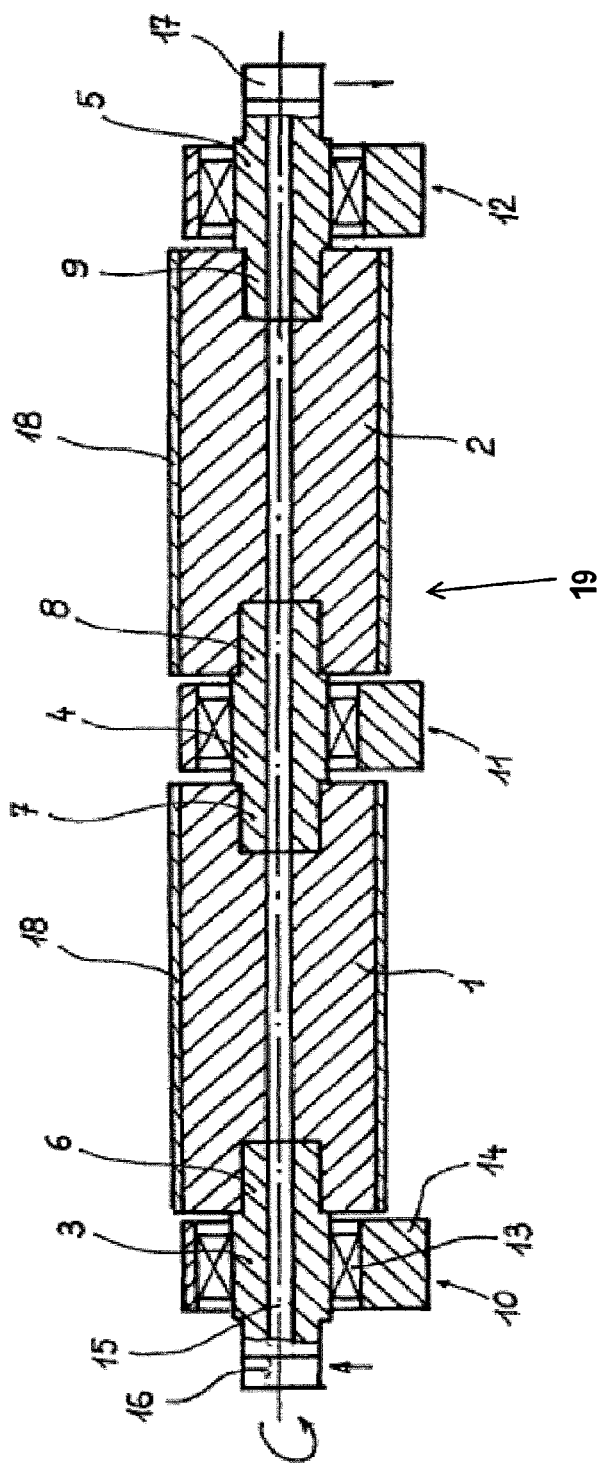
FIG. 1 shows a schematic view of a strand guiding roller in longitudinal section.

Strand guiding rollers 19 are used in a continuous casting installation for guiding and supporting an at least partially solidified metal strand emerging from a continuous casting mold and are known as such in many different types of construction. Depending on the width of the cast metal strand, strand guiding rollers 19 are mounted at two or more locations. Under the effect of the hot and heavy metal strand, the strand guiding rollers 19 are exposed to high thermal and mechanical loadings, which require continual maintenance and therefore alternating work on the continuous casting installation. FIG. 1 shows in a schematic representation a strand guiding roller 19 mounted at three locations, as used in the strand guidance of a continuous casting installation, and is generally produced and assembled from standard components, prefabricated components and semifinished components. The strand guiding roller here comprises two roller shells 1, 2, which are supported on supporting shafts 3, 4, 5. The supporting shafts run out into supporting shaft journals 6, 7, 8, 9, which protrude into recesses of the roller shells and with the latter form a connection for conjoint rotation. The supporting shafts 3, 4, 5 are supported in bearing units 10, 11, 12, respectively comprising a rolling bearing 13 and a bearing housing 14, which is also referred to as a bearing block. The strand guiding roller is passed through by a centrally penetrating coolant channel 15 and is connected at the extreme ends to rotary lead-throughs 16, 17 for leading in (shown by an arrow directed at element 16 in FIG. 1) and leading away a coolant (shown by an arrow directed away from element 17 in FIG. 1). The roller shells 1, 2 have a wear-resistant surface layer 18, which increases the service life of the strand guiding roller.

The construction of the strand guiding roller 19 is not essential for the present invention, and there does not have to be any cooling.

Figure 2:
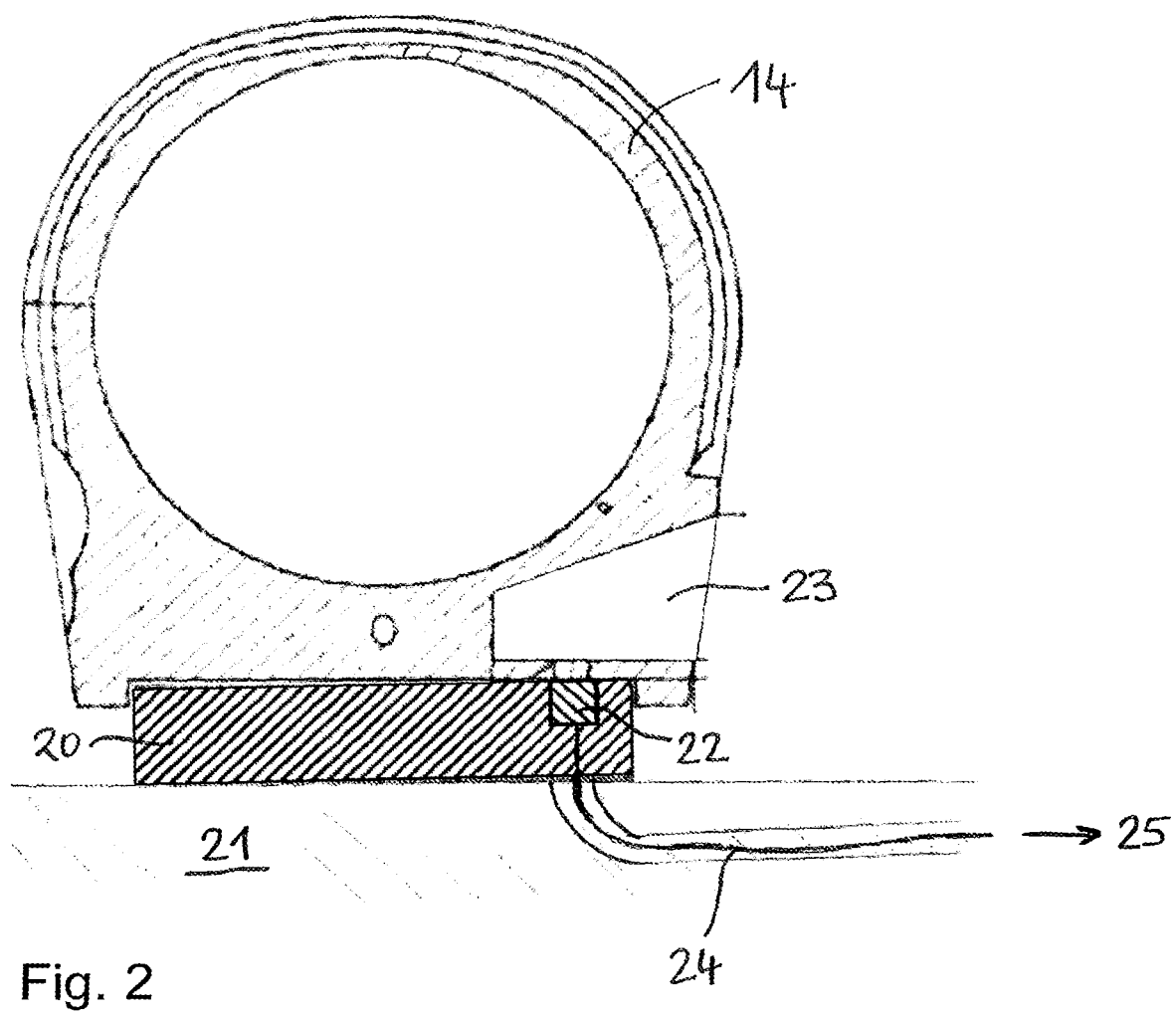
FIG. 2 shows a cross section through a bearing housing of a strand guiding roller.

In FIG. 2, a cross section through a bearing housing 14 is represented. The bearing 13 is not shown. The bearing housing 14 is mounted on a structural part 20, which here is an intermediate plate. The intermediate plate 20 is fastened on the supporting structure 21. The supporting structure 21 may be a segment of a continuous casting installation which carries a number of strand guiding rollers 19. The bearing housing 14 covers the intermediate plate 20, and so the latter essentially cannot be seen from the axis of rotation of the strand guiding roller 19. In the case of FIG. 2, the bearing housing 14 also partially reaches laterally around the intermediate plate 20.

Provided in the bearing housing 14 close to its underside is a recess 23, fitted into which is a printed circuit board, on which the data processing unit, that is to say for instance the CPU and the memory, the data transmission unit, that is to say for instance the antenna, and the energy receiving unit are mounted. The printed circuit board has a surface area of less than 4000 mm2, preferably of less than 3000 mm2, particularly preferably less than 1800 mm2, and, including the electronic components located on it, is less than 18 mm high, in particular less than 30 mm high, particularly preferably less than 9 mm high. The printed circuit board is connected by means of electrical lines in the form of wires to the corresponding sensors, which are arranged at another location in the bearing housing 14, for instance closer to the bearing. Sensors that are arranged on the printed circuit board are correspondingly in connection with the data processing unit via conductor tracks of the printed circuit board.

The energy receiving unit is arranged, in particular on the printed circuit board, in such a way that it is close to the intermediate plate 20, in particular the energy receiving unit is arranged in that part of the recess 23 that represents a breakthrough to the intermediate plate 20. The recess 23 is otherwise laterally open, in order to allow the printed circuit board to be fitted into the bearing housing 14.

The energy transmitting unit 22 is arranged in a recess of the intermediate plate 20 that is open toward the bearing housing 14. The energy transmitting unit 22 is connected by means of an electrical line 24 to the battery 25 serving as an energy source, which is assigned to the segment of the strand casting installation.

When the bearing housing 14 is removed for maintenance purposes, the energy transmitting unit 22 remains in the intermediate plate 20, and consequently on the supporting structure 21; the battery 25, which serves for driving and adjusting the strand guiding roller 19, remains in any case on the supporting structure 21 or some other place assigned to the segment of a continuous casting installation.

Figure 3:
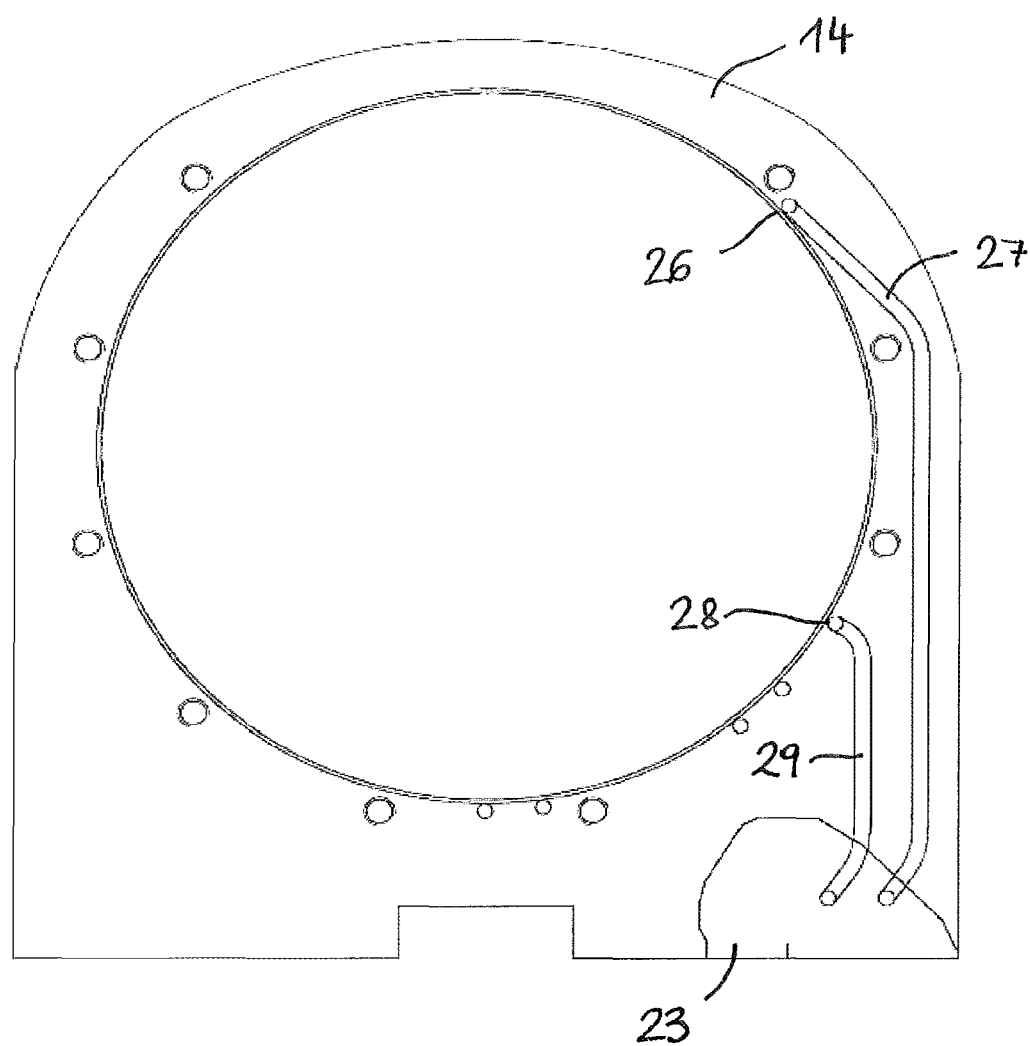
FIG. 3 shows the arrangement of sensors in the bearing housing.

In FIG. 3, a section through a bearing housing 14 is shown. In the sectional representation, a place for a first sensor 26 is shown and also an associated conductor groove 27, in which a corresponding conductor for the connection of the first sensor 26 to the printed circuit board, not shown here, arranged in the recess 23 for signal transmission can be laid. Similarly provided for a second sensor 28 is an associated conductor groove 29, for the connection of the second sensor 28 to the printed circuit board, not shown here, in the recess 23, for the purpose of signal transmission.

The recess 23 is downwardly open, and so an inductive coupling between the energy transmitting unit 22, see FIG. 2, and the energy receiving unit, which is arranged in the recess 23, can take place. The data processing unit, the data transmission unit and the energy receiving unit are arranged on a common printed circuit board, which here can be placed into the recess 23 from below.

When the printed circuit board has been fitted into the recess 23 horizontally in FIG. 3, the energy receiving unit is arranged on the underside of the printed circuit board, and so it is located close to the intermediate plate 20 represented in FIG. 2.

LIST OF DESIGNATIONS

1, 2 Roller shells
3, 4, 5 Supporting shafts
10, 11, 12 Bearing units
13 Bearing (rolling bearing)
14 Bearing housing
15 Coolant channel
16, 17 Rotary lead-throughs
18 Wear-resistant surface layer
19 Strand guiding roller (rotatable component)
20 Intermediate plate (structural part)
21 Supporting structure
22 Energy transmitting unit
23 Recess in bearing housing 14
24 Electrical line
25 Battery (energy source)
26 First sensor
27 Conductor groove
28 Second sensor
29 Conductor groove

The invention claimed is:
1. A device for capturing and transmitting data of a bearing of a steel mill or rolling mill, the device comprising:
   a bearing housing for a bearing for rotatable components;
   a sensor with a data processing unit, both of which are arranged in the bearing housing and are adapted to capture and store data of the bearing;

a data transmission unit arranged in the bearing housing and adapted to wirelessly transmit data of the sensor to a remote receiver;

an energy receiving unit arranged in the bearing housing and adapted to receive energy wirelessly and power the data transmission unit and the data processing unit;

an energy source with an energy transmitting unit adapted to supply the energy receiving unit wirelessly with energy, the energy source and the energy transmitting unit being arranged outside the bearing housing, the energy transmitting unit being covered by the bearing housing; and a supporting structure of a steel mill or rolling mill, the energy transmitting unit being arranged on or in a structural part which adjoins the bearing housing and is part of the supporting structure of the steel mill or rolling mill;

wherein the structural part is designed to remain on the supporting structure of the steel mill or rolling mill when the bearing housing is removed for maintenance purposes.

2. The device as claimed in claim 1, wherein the energy receiving unit in the bearing housing and the energy transmitting unit in the structural part are arranged close to a surface and proximal to one another.

3. The device as claimed in claim 1, wherein the energy transmitting unit is arranged in a recess of the structural part that is aligned with the bearing housing in an operating state of the device.

4. The device as claimed in claim 1, further comprising at least one segment of a continuous casting installation, the at least one segment comprising a battery or an AC voltage supply, the energy source being a battery of a segment of a continuous casting installation or an AC voltage supply of a segment of a continuous casting installation, the segment comprising one or more strand guiding rollers, and the energy source being connected to the energy transmitting unit by an electrical line.

5. The device as claimed in claim 1, wherein the energy transmitting unit and the energy receiving unit are adapted to transmit and receive energy by inductive coupling.

6. The device as claimed in claim 5, wherein the energy transmitting unit and the energy receiving unit are adapted to transmit and receive energy by resonant inductive coupling.

7. The device as claimed in claim 1, wherein the energy transmitting unit and the energy receiving unit are adapted to transmit energy at a frequency of greater than or equal to 100 kHz.

8. The device as claimed in claim 7, wherein the frequency is greater than 300 kHz.

9. The device as claimed in claim 1, wherein the data processing unit, the data transmission unit, and the energy receiving unit are arranged on a common printed circuit board.

10. The device as claimed in claim 9, wherein the common printed circuit board is arranged in a recess of the bearing housing, the recess having a greatest cross section less than 4000 mm2.

11. The device as claimed in claim 10, wherein the recess has a greatest cross section less than 3000 mm2.

12. The device as claimed in claim 11, wherein the recess has a greatest cross section less than 1800 mm2.

13. The device as claimed in claim 12, wherein the frequency is greater than or equal to 2.4 GHz.

14. The device as claimed in claim 1, wherein the data transmission unit is adapted to transmit data at a frequency to a remote receiver, the frequency being greater than or equal to 800 MHz.

15. The device as claimed in claim 1, wherein the bearing housing is part of a strand guide of a bloom.

16. The device as claimed in claim 1, wherein the bearing housing is part of a slab continuous casting installation.

17. A method of capturing and transmitting data of a bearing of a steel mill or rolling mill, comprising housing a bearing for rotatable components in a bearing housing;

capturing and storing data of the bearing with a sensor coupled to a data processing unit, the sensor and the data processing unit being arranged in the bearing housing;

transmitting wirelessly data of the sensor to a remote receiver by a data transmission unit arranged in the bearing housing;

receiving energy wirelessly and powering receive the data transmission unit and the data processing unit by an energy receiving unit arranged in the bearing housing;

supplying energy wirelessly to the energy receiving unit from an energy source with an energy transmitting unit, the energy source and the energy transmitting unit being arranged outside the bearing housing, the energy transmitting unit being covered by the bearing housing; and providing a supporting structure of a steel mill or rolling mill, the energy transmitting unit being arranged on or in a structural part which adjoins the bearing housing and is part of the supporting structure of the steel mill or rolling mill;

wherein the structural part is designed to remain on the supporting structure of the steel mill or rolling mill when the bearing housing is removed for maintenance purposes.

* * * * *